United States Patent Office 3,526,895
Patented Sept. 1, 1970

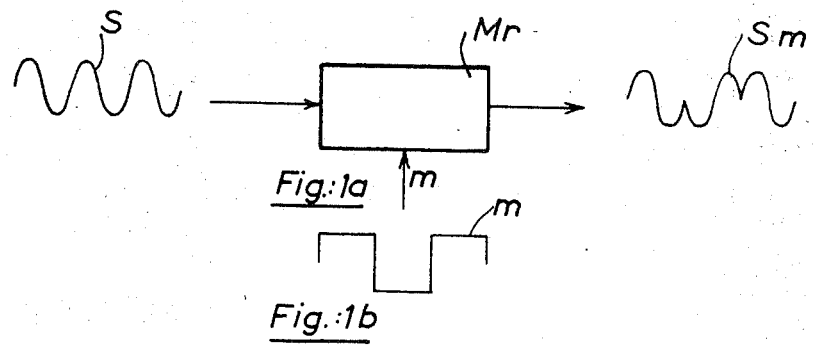
Fig.:1a
Fig.:1b
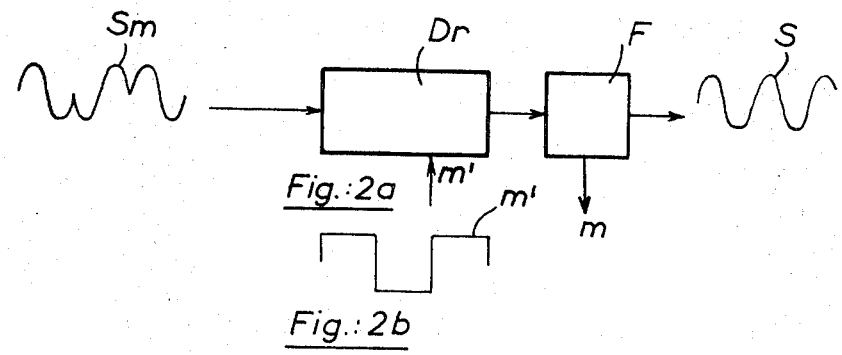
Fig.:2a
Fig.:2b
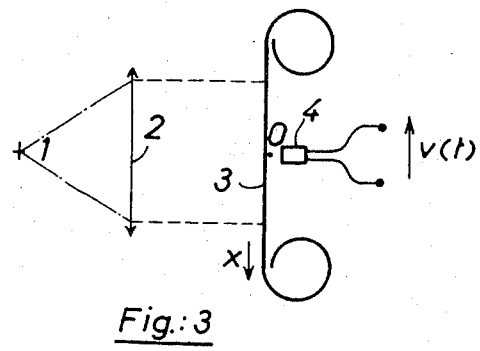
Fig.:3

3,526,895
OPTICAL PROCESS APPLIED TO
RADIO RANGE DETECTION
Jean-Louis Henri François Guyon de Montlivault, Saint-Michel-sur-Orge, France, assignor to Centre National d'Etudes Spatiales, Paris, France, a company of France
Filed Apr. 25, 1968, Ser. No. 723,990
Claims priority, application France, Apr. 25, 1967, 104,109
Int. Cl. G01s 9/06
U.S. Cl. 343—13      9 Claims

ABSTRACT OF THE DISCLOSURE

A radio range detection system of the type resorting to a subcarrier wave transmitted between two remote stations to be modulated at the transmitting end for instance by a pseudo random code and demodulated at the receiving end. A rough and a fine estimation of the delay to which the wave has been subjected are obtained by resorting at the receiver end to an optical equipment producing simultaneously a large number of correlating functions which allow synchronizing a local code generator provided for demodulation. Said optical equipment is associated with the usual means demodulating the wave received and producing a fine measurement of its phase by making use of the information thus supplied by said optical correlating equipment.

---

The application of a so-called correlating optical method to the measurement through radio-electric means of the distances between movable or stationary objects separated by often considerable distances and which are generally out of reach with reference to one another, is well-known by all specialists and has been described by Talamini and Farnett in a paper entitled "New Target for Radar-Sharper Vision With Optics" in American Electronics, vol. 38, No. 26, of Dec. 27, 1965 (pp. 58 to 66). Such measurements are necessary, in particular in the case where it is desired to localize a target moving in space or to define the location of an aircraft or a target moving in space with reference to a satellite.

It is a well-known fact that for such measurements only suitable radio-electric signals may be used.

It is also known that the measurement made is actually that of a duration which is a simple multiple of the duration of propagation of an electric signal between two objects. Generally speaking, the distance which it is desired to obtain, that is, the range of the measurement, is considerable, so that the received signal is very weak and therefore difficult to separate from the background noise in the receiving means, in spite of the always increasing accuracy required for such measurements.

The simplest technique to this end consists in resorting to a number of subcarrier waves and in measuring a phase shifting to which a sinusoidal or other wave is subjected during its propagation over the distance to be measured. For technical reasons, it is necessary to execute phase measurements of a comparatively low frequency modulating a high frequency carrier wave lying generally within the range of hyper-frequencies. The signal which can be used after demodulation is then easily filtered so that the background noise may be cut out, in particular if the demodulation is coherent.

It should however be remarked that such a method does not allow distinguishing distances for which the durations of propagation differ only by an integral number of periods of the subcarrier wave. It is therefore necessary to reduce the frequency of the latter if it is desired to increase the range.

By reason of the limitations in the performance of phasemeters, there is generally no possible consistency between the accuracy required and the frequency to be given to the subcarrier wave when it is desired to measure distances without any ambiguity throughout the range to be considered. This difficulty may be cut out by modulating the carrier wave by a plurality of pure frequencies, the values of which are distributed in accordance with a geometrical progression. A first estimation is given out by the phase-shifting of the lowest subcarrier wave. By using the next lowest subcarrier wave after the manner of a vernier, it is possible to obtain a more accurate measurement and so on until the highest frequency is reached, which allows obtaining the required accuracy. This is somewhat an application of the so-called reiteration method.

The technique disclosed is simple, but unfortunately, after demodulation, only a small fraction of the total energy of the signal is available for each subcarrier wave. This drawback may be removed, according to the invention, by resorting to a further principle well-known in the art (see I.R.E.—Transactions in Space Electronics and Telemetry—June 1962 "A skin tracking radar experiment involving the courier satellite." by M. Easterling.) It consists primarily in modulating the phase of a single subcarrier wave by a pseudo-random code.

The following description given by way of an example and in a non-limiting sense, reference being made to the accompanying drawings, will allow a ready understanding of the invention. In said drawings:

FIG. 1a is a synoptic diagram showing the modulation of a subcarrier sinusoidal wave by a signal of a pseudo-random code, a sketch of which appears in FIG. 1b.

FIG. 2a is a similar diagram relating to the demodulation of the received signal, in order to recover the modulating signal which is sketched out in FIG. 2b.

Lastly, FIG. 3 is a diagram illustrating the principle of the improved optical method resorted to according to the invention, with a view simultaneously executing various products of the signal received, that is a signal which is a function of time, by different local signals which are also functions of time and which are shifted with reference to one another so as to simultaneously form various values of the so-called correlating function, which are as many internal composition products as disclosed by the theory of functions.

The duration of a bit of the code is equal to one period of the subcarrier wave. The diagram of FIGS. 1a and 1b show how such a signal can be obtained.

In FIG. 1a, the curves illustrates the pure sinusoidal subcarrier wave at the input of the modulating means Mr while the curve $Sm$ illustrates said sinusoidal wave as it appears at the output of said modulating means. The curve $m$ in FIG. 1b illustrates the shape of the modulating signal such as may be supplied for instance by a coded recirculating shift register.

At the receiving end, it is sufficient to execute the reverse operation in conformity with the diagram illustrated in FIG. 2a. In FIG. 2a the curve $Sm$ illustrates the received signal applied at the input of the demodulating means Dr followed by a separating filter F which restores at its output end the pure sinusoidal wave S, and on the other hand the modulating signal $m'$ illustrated in FIG. 2b which is that of the pseudo-random code, provided that the phase of the modulating signal $m'$ applied to the demodulating stage Dr is the same as that of the received signal $Sm$.

The phase shifting between the modulating signal $m$ of FIG. 1b which is the transmitted signal and the modulating signal $m'$ of FIG. 2b which is the received signal is equal to a simple multiple, generally the double, of the duration of propagation of the single subcarrier wave used for measuring the distance considered.

The pseudo-random codes obtained, in particular by means of a multivibrator, have a number of properties which are of a considerable interest for the application to be considered. In particular, the level of the sinusoid obtained after filtering the demodulated signal is at a maximum when the local code is in phase with the modulating code of the received signal. As soon as the phase-shift is higher than one period of the subcarrier wave, the amplitude of the sinusoidal wave at the output end of the filter F (FIG. 2a) is divided by $n$, $n$ being the periodof of the code. The definition of the phase shifting of the code modulating the received signal allows cutting out the ambiguity associated with the frequency of the sinusoid S.

However, the difficulty resides in the selection of the phase shifting to be given to the local code controlling the demodulating means with a view to recovering in practice a pure frequency. The method resorted to hitherto consists in executing a succession of tests with various delays of the local code with reference to the code at the transmitting station. When the code modulating the received signal is in phase with that obtained in the receiver, the demodulator supplies a sinusoidal wave passing through the filter F. A control arrangement allows then maintaining phase synchronism between the signal and the local code throughout the duration required for a measurement. Said method which operates through a succession of tests may require a long time before a useful result may be obtained if the period of the code is large. This is not objectionable when it is desired to follow single targets. Even if said time is long, the period of visibility is generally sufficiently extended for said target to be followed over a sufficient length of its path. For other applications, in contradistinction, the time available for obtaining a useful result is a limited one. It may seem that it is not possible in such a case to resort to pseudo-random codes, in spite of the advantages they provide. Any arrangement which allows reducing the time involved is therefore of a considerable interest.

A solution which is hardly economical would consist in inserting N demodulators in parallel and in controlling them by codes showing different phases so that it is possible to find one demodulator for which the signal received and the local code are actually in phase. If $n$ is the period of the code, it would be necessary to have at least $N=2n$ demodulators.

Such a multiplication of the receiving circuits appears as superfluous if the following remark is made: The generator of the local code can be set accurately by means of a rough estimation of the delay of the received signal. The N demodulators considered hereinabove are then superabundant, since each of them provides a complete measurement. This consideration has led to the present invention.

Such a rough estimation of the delay may be made by a separate equipment. Since a matched filter is difficult to execute for the signals of a complex nature considered, one is led to resort to so-called correlating means.

According at least to theory, the best method for measuring the duration of propagation consists in executing a correlation, that is the product of the signal received $y(t)$ by a reference signal $r(t-\tau)$ which is the same as the transmitted signal delayed by a duration $\tau$. The integral is then calculated $$g(\tau) = \int_0^T y(t) r(t-\tau) d\tau$$

for all possible values of $\tau$ since it is at a maximum for the searched value.

Said operation may be executed by an electronic circuit having an impulse response $s$ ($T0-t$, $T0$ being a constant. As is thus apparent, a matched filter may be employed to perform the operation; however, as the signals employed become increasingly complex, the provision of a suitable filter becomes increasingly more difficult. For this reason, it is preferably to resort to a so-called correlating system which forms automatically the product which may be termed the correlated function. The calculation of said product constrains one to execute two operations, to wit: a multiplication followed by an integration. Several means are available for their execution:

(a) It is possible to resort to a numerical computer to form the above integral. If $n$ points are sampled within a time interval T, it is necessary to provide $n$ products for each integral. Since the calculation is to be executed for each of the $n$ possible values of $\tau$, it is necessary to execute $n^2$ elementary operations. For complex signals, said number becomes rapidly prohibitive if it is desired to obtain speedily the desired result.

(b) It is possible to resort to an electronic multiplier followed by an integrator for the calculation of the correlated function. If it is desired to speedily obtain the desired result, it is necessary to resort to N arrangements of this type inserted in parallel, so that the calculation may be performed simultaneously for all the values of $\tau$. Said last solution is too expensive.

(c) Lastly, and this forms one of the major objects of the invention, it is possible to resort to an optical arrangement forming automatically and simultaneously the correlated product between the received signal on the one hand and on the other hand the $n$ reference functions which are identical, but shifted in time with reference to one another. FIG. 3 illustrates diagrammatically such an arrangement.

Considering the simplest diagram wherein a single local reference function multiplies the received signal, a source in light 1 (FIG. 3) whether punctual or extending linearly in a transverse direction is modulated by the received signal $s(t)$. A suitable optical system 2 projects the beam from said source onto a film 3 of the variable opacity type. It is assumed that said film provides a variable opacity only in a longitudinal direction. The fraction of light passing through the film 3 assumes therefore a value $l(t)$. During the progression of the film across the point O, there is obtained a modification in the transmitted light equal to $l(t)$. Now, if a photo-cell 4 is positioned at O, it receives a luminous intensity proportional to the product $s(t) \cdot l(t)$.

If T is the duration of integration of the circuits associated with the cell, the voltage collected at the output of the circuit of said cell is given out by $$v(t) = \int_{t-T}^{t} s(\tau) l(\tau) d\tau$$

Said expression is equal to $g(0)$ if $g(\tau)$ is the correlating function of $s(t)$ and $l(t)$. In order to obtain the value of $g$ for other values of $\tau$, it is sufficient to have other auxiliary sources of light cooperating with other photocells registering therewith on opposite sides of the film at different points of its path. The output voltages of the cells are given out by the formulas:

$$g(k\Delta r) k = 1, 2 \ldots n$$

while $\Delta \tau = T/n$, $n$ being the number of cells.

Thus, $n$ correlating operations are executed in parallel. The cell for which the output signal is at a maximum produces the desired value of $\tau$. When $n$ is large, it is simpler to replace the cells by an image-analyzing tube.

With very simple equipment, it is thus possible to solve the problem of the estimation of the delay $\tau$ to which a pseudo-random code is subjected. The equipment illustrated does not provide however the only possible solution. As a matter of fact, there exist numerous optical assemblies termed correlators which allow reaching the same result.

Briefly stated, the present invention allows measuring speedily the delay $\tau$ of the signals obtained by pseudo-random codes through the execution of a novel apparatus associating two sections of a known type, to wit:

An optical correlating equipment giving out for the delay $\tau$ of the received signal, a "rough" estimation which is however sufficient for synchronizing the generator of the local code.

An arrangement for demodulating the subcarrier wave and providing a "fine" measurement of its phase, which makes use of the information supplied by the optical correlating arrangement. Since the definition of the phase shifting to which the code has been subjected is no longer obtained by a succession of tests, it is possible to conclude that the time required for such a search by prior art apparatus is divided by $n$, $n$ being the period of the code. This forms the main advantage of the measuring principle which relies on the following remark:

The measurement of the phase of a subcarrier wave modulated by a pseudo-random code may be executed in two stages:

Definition of the phase of the code for which it is sufficient to obtain a "rough" estimation of the delay $\tau$ to which the signal has been subjected.

"Fine" measurement of the phase of the subcarrier wave after demodulation.

In the preceding disclosure, only signals of a single frequency modulated by a pseudo-random code have been considered.

Now, it is possible to replace said single frequency by any periodical signal of the same fundamental frequency. Said signal may be constituted in particular by that of a clock supplying square signals.

Instead of a pseudo-random code, it is also possible to resort to other codes, of which the self-correlation functions have similar characteristic features or properties.

Similarly, in the execution of the optical correlating equipment, it is not necessary to be limited to a single particular diagram. Any arrangement which allows obtaining in parallel, that is simultaneously, correlated functions, is suitable for such a purpose.

Furthermore, it is not necessary for the purpose of correlation for the local or reference signal to be identical with the code used to modulate the transmitted signal. It is sufficient for said local or reference signals to produce a cross correlation function having suitable characteristic properties. In particular, the reference signals may be obtained by modulating a square wave clock, or clock pulse train, whereas the signals transmitted may be obtained by means of a clock producing a sinusoidal wave.

What I claim is:

1. In a radio range detecting system providing for transmitting a subcarrier wave modulated by a predetermined coding function and for receiving and demodulating an incoming code modulated subcarrier wave in accordance with a reference coding function related to said predetermined coding function, for effecting range determination, the combination at the receiving station comprising:

correlating means responsive to an incoming code modulated subcarrier wave and to a plurality of reference coding functions of different time displacements relative to the transmitted, modulated subcarrier wave for simultaneously generating a respectively related plurality of correlation products of the incoming wave and the plurality of reference functions to provide an estimate in accordance with the values of those correlation products of the time delay experienced by the modulated subcarrier wave during transmission, a reference function generator responsive to said correlating means and synchronized by the time delay estimate produced thereby, and demodulating means controlled by said reference function generator and responsive to the incoming subcarrier wave to produce a precise measurement of the time delay.

2. The combination as recited in claim 1 wherein the reference function generator comprises a local code generator for producing a code signal for supply to said demodulating means to modulate the incoming modulated subcarrier wave.

3. The combination claimed in claim 6 wherein said transmitted subcarrier wave is modulated by a pseudorandom code and wherein said reference function generator produces a corresponding pseudorandom code for supply to said demodulating means.

4. The combination claimed in claim 2, wherein the local code generator supplies local code signals of the same waveshape as those employed to modulate the incoming subcarrier wave, and includes means for shifting the phase of said local code signals by successive steps to serve as successive local reference functions of different time displacements relative to the transmitted subcarrier wave for the demodulation of the received signals.

5. The combination claimed in claim 1, wherein:

said correlating means comprises optical correlating equipment including a source of light modulated by the received signals, a film of the variable opacity-type, means for moving said film along a path facing said source, an optical system projecting the light from said source through a predetermined point of the path of the film, and a photocell subjected to the light passing through said point and generating an output current varying in amplitude in accordance with the intensity of the light and the opacity of the film at any moment for synchronization of said local generator.

6. The combination claimed in claim 1 wherein:

said correlating means comprises optical correlating equipment including a film of the variable opacity-type, means for moving said film along a predetermined path, an illuminating system controlled in intensity of illumination by the received signals, an optical system rojecting light from said illuminating system onto and through different spaced points of the path of said film, and photocells positioned for registration with said different points and producing output currents defining correlation functions corresponding to the differences in phase associated with the spacing between said points of the path of said film.

7. In a method for range determination including transmitting a subcarrier wave modulated by a predetermined coding function and receiving and demodulating an incoming code modulated subcarrier wave in accordance with a reference coding function related to said predetermined coding function, the improvement comprising:

generating a plurality of reference coding functions of different time displacements relative to the transmitted, modulated subcarrier wave, simultaneously producing the correlation products of the incoming wave and the plurality of reference functions to provide an estimate in accordance with the values of those correlation products of the time delay experienced by the modulated subcarrier wave during transmission, generating a reference code and synchronizing the reference code in accordance with the time delay estimate provided by the corelation products, and demodulating said incoming subcarrier wave in response to the synchronized reference code to produce a precise measurement of the time delay.

8. In a method for range determination as recited in claim 7, the improvement further comprising:

generating a reference code of the same waveshape as that of the predetermined coding function employed to modulate the transmitted subcarrier wave.

9. In a method for range determination as recited in claim 7, the improvement further comprising:

generating a plurality of succesively phase shifted steps of said reference code, and selecting one of said phase shifted steps in accordance with the time delay estimate provided by the correlation products for obtaining a synchronized reference code for demodulating said incoming subcarrier wave.

References Cited

UNITED STATES PATENTS

| | | |
|---|---|---|
| 3,088,113 | 4/1963 | Rosenthal. |
| 3,211,898 | 10/1965 | Fomenko. |
| 3,386,095 | 5/1968 | Stevens _____ 343—17.5 |
| 3,388,240 | 6/1968 | Robins _____ 343—100 XR |
| 3,398,269 | 8/1968 | Williams _____ 343—100 XR |

RODNEY D. BENNETT, Primary Examiner

J. P. MORRIS, Assistant Examiner

U.S. Cl. X.R.

343—17.5

PO-1050
(5/69)

UNITED STATES PATENT OFFICE
CERTIFICATE OF CORRECTION

Patent No. 3,526,895      Dated September 1, 1970

Inventor(s) Jean-Louis Henri Francois Guyon de Montlivault

It is certified that error appears in the above-identified patent and that said Letters Patent are hereby corrected as shown below:

Column 2, line 39, after "view" insert -- to --.

Column 4, line 2, delete "preferably" and insert -- preferable --.

Column 6, line 3, delete "6" and insert -- 1 --.

Column 6, line 39, delete "rojecting" and insert -- projecting --.

SIGNED AND
SEALED
NOV 24 1970

(SEAL)
Attest:

Edward M. Fletcher, Jr.
Attesting Officer

WILLIAM E. SCHUYLER, JR.
Commissioner of Patents